(12) United States Patent
Kim

(10) Patent No.: US 12,156,614 B2
(45) Date of Patent: Dec. 3, 2024

(54) FOOD PROCESSOR

(71) Applicant: NUC Electronics Co., Ltd., Daegu (KR)

(72) Inventor: Jong Boo Kim, Daegu (KR)

(73) Assignee: NUC Electronics Co., Ltd., Daegu (KR)

( * ) Notice: Subject to any disclaimer, the term of this patent is extended or adjusted under 35 U.S.C. 154(b) by 336 days.

(21) Appl. No.: 17/624,540

(22) PCT Filed: Nov. 29, 2019

(86) PCT No.: PCT/KR2019/016701
§ 371 (c)(1),
(2) Date: Jan. 3, 2022

(87) PCT Pub. No.: WO2021/006435
PCT Pub. Date: Jan. 14, 2021

(65) Prior Publication Data
US 2022/0240722 A1 Aug. 4, 2022

(30) Foreign Application Priority Data
Jul. 5, 2019 (KR) .......................... 10-2019-0081452

(51) Int. Cl.
*A47J 43/046* (2006.01)
*A47J 43/07* (2006.01)

(52) U.S. Cl.
CPC ............. *A47J 43/046* (2013.01); *A47J 43/07* (2013.01); *A47J 43/0772* (2013.01)

(58) Field of Classification Search
CPC ....... A47J 43/046; A47J 43/0772; A47J 43/07
See application file for complete search history.

(56) References Cited

U.S. PATENT DOCUMENTS 4,883,144 A * 11/1989 Haushalter ............... A47J 43/07
181/198
5,957,577 A * 9/1999 Dickson ................... A47J 43/07
366/347
(Continued)

FOREIGN PATENT DOCUMENTS

AU 2018100064 B4 5/2018
CN 106231966 A 12/2016
(Continued)

OTHER PUBLICATIONS

The Extended European Search Report for European Patent Application No. 19936886.1, dated Jul. 20, 2023.

*Primary Examiner* — Faye Francis

(57) ABSTRACT

A cooking device includes: a container having a top opening and a receiving space in which food put into the container through the opening is received; a lid which is detachably coupled to the container so as to open and close the opening, and has a first vent channel communicating with the receiving space; an enclosure which is provided to at least partially enclose the container and the lid, and has a second vent channel communicating with the first vent channel; a vacuum pump connected to the second vent channel; and a foreign matter trapping unit which is provided between the first and second vent channels to prevent foreign matter, introduced into the first vent channel in the process of venting gas in the receiving space by the vacuum pump, from being introduced into the second vent channel.

11 Claims, 12 Drawing Sheets

(56) References Cited

U.S. PATENT DOCUMENTS

| | | | |
|---|---|---|---|
| 6,571,908 B2* | 6/2003 | Bohannon | A47J 43/0716 181/198 |
| 7,520,663 B1* | 4/2009 | Kolar | A47J 43/07 366/347 |
| 8,087,603 B2* | 1/2012 | Kolar | A47J 43/046 241/285.3 |
| 8,287,180 B2* | 10/2012 | Kolar | A47J 43/0716 366/347 |
| RE45,655 E | 8/2015 | Kolar et al. | |
| 10,376,102 B2* | 8/2019 | Bock | B01F 27/90 |
| 10,383,481 B2* | 8/2019 | Kim | A47J 43/0772 |
| 10,750,907 B2* | 8/2020 | Kim | B02C 18/16 |
| 2005/0152215 A1* | 7/2005 | Stuart | A47J 43/0716 366/205 |
| 2014/0217211 A1* | 8/2014 | Sanford | A47J 43/0761 241/37.5 |
| 2018/0132664 A1* | 5/2018 | Kim | A47J 43/046 |
| 2018/0199748 A1 | 7/2018 | Patel et al. | |
| 2019/0133378 A1* | 5/2019 | Kim | A47J 43/046 |

FOREIGN PATENT DOCUMENTS

| | | | | |
|---|---|---|---|---|
| CN | 106377181 A | * | 2/2017 | A47J 43/046 |
| CN | 206462899 U | | 9/2017 | |
| CN | 108378725 A | * | 8/2018 | A47J 43/046 |
| CN | 208808280 U | | 5/2019 | |
| CN | 110236422 A | * | 9/2019 | A47J 19/02 |
| EP | 3 424 380 A1 | | 1/2019 | |
| EP | 3 427 620 A1 | | 1/2019 | |
| JP | 2014073276 A | | 4/2014 | |
| JP | 2015-119868 A | | 7/2015 | |
| JP | 2018-79293 A | | 5/2018 | |
| KR | 20180077123 A | * | 7/2018 | A47J 43/046 |
| KR | 20190019690 A | | 2/2019 | |
| KR | 10-2019-0051754 A | | 5/2019 | |
| KR | 20190047678 A | | 5/2019 | |
| KR | 20190051754 A | | 5/2019 | |
| WO | WO-2019022398 A1 | * | 1/2019 | A47J 43/046 |

\* cited by examiner

FOOD PROCESSOR

TECHNICAL FIELD

The disclosure relates to a food processor, and more particularly to a food processor in which foreign materials inhaled in a vacuum intake process are filtered out.

BACKGROUND ART

There are various food processors for grinding, mixing, juicing, etc. food.

In the food processor, food to be processed is generally put into a container and then subjected to a process using a processing member (a blade, a screw, etc.).

To prevent food from oxidizing while being processed, there have recently emerged food processors that process food after the inside of the container undergoes vacuum exhaust to have a negative pressure environment.

However, when foreign materials are introduced into an exhaust channel during a vacuum exhaust process, the foreign materials reach the vacuum pump and the vacuum pump is eventually damaged.

DISCLOSURE

Technical Problem

An aspect of the disclosure is to provide a food processor in which foreign materials are effectively blocked.

The aspects of the disclosure are not limited to the foregoing aspect, and other aspects not mentioned above will become apparent to those skilled in the art from the following descriptions.

Technical Solution

To achieve the aspect of the disclosure, a food processor according to an embodiment of the disclosure includes: a container comprising an opening formed at a top, through which food is introduced, and an accommodating space in which the food introduced through the opening is accommodated; a lid removably coupled to the container to allow the opening to be opened and closed, and comprising a first exhaust channel formed to communicate with the accommodating space when coupled to the container; an enclosure provided to at least partially enclose the container and the lid, and comprising a second exhaust channel communicating with the first exhaust channel; a vacuum pump connected to the second exhaust channel; and a foreign-material trap unit provided between the first exhaust channel and the second exhaust channel and preventing foreign materials introduced into the first exhaust channel from being introduced into the second exhaust channel while gas in the accommodating space is discharged by the vacuum pump.

Other details of the disclosure are included in the detailed description and the accompanying drawings.

Advantageous Effects

According to embodiments of the disclosure, effects are at least as follows.

Not only a solid foreign material but also a small amount of liquid foreign material is effectively blocked.

The effects according to the disclosure are not limited to the foregoing example, and more various effects are involved in the present specification.

BEST MODE

Figure 1:
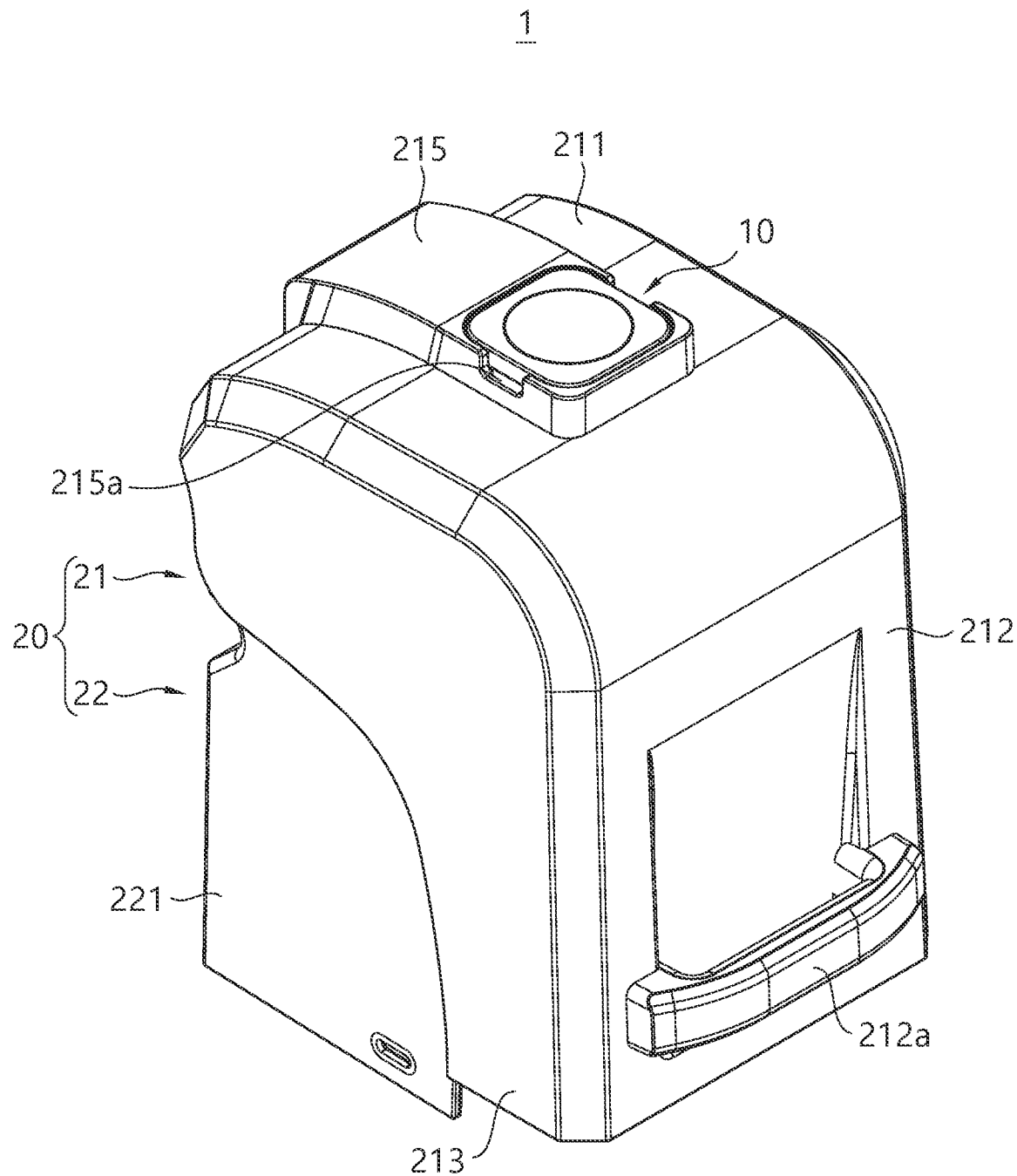
FIG. 1 is a perspective view partially showing a food processor according to an embodiment of the disclosure.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure and to allow those skilled in the art to understand the category of the disclosure. The disclosure is defined by the category of the claims.

Further, embodiments of the disclosure will be described with reference to cross-sectional views and/or schematic views as idealized exemplary illustrations. Therefore, the illustrations may be varied in shape depending on manufacturing techniques, tolerance, and/or etc. Further, elements in the drawings may be relatively enlarged or reduced for convenience of description. Like numerals refer to like elements throughout.

Below, the disclosure will be described with reference to the accompanying drawings for describing a food processor according to an embodiment of the disclosure.

FIG. 1 is a perspective view partially showing a food processor according to an embodiment of the disclosure.

As shown in FIG. 1, a food processor 1 according to an embodiment of the disclosure includes an enclosure 20 and a foreign-material trap unit 10.

The enclosure 20 shown in FIG. 1 is detachably installed on a base (not shown). The base may internally include a motor, a vacuum pump, a circuit board for controlling the motor and the vacuum pump, a control means for controlling the food processor 1, etc.

FIG. 1 illustrates the food processor 1 with the enclosure 20 detachably installed on the base as an embodiment for describing the disclosure, but the disclosure is not limited to this embodiment. According to an alternative embodiment, the foreign-material trap unit 10 may be installed in an enclosure accommodating even the base therein.

Further, FIG. 1 shows an example that the enclosure 20 includes an upper enclosure 21 and a lower enclosure 22, but the disclosure is not limited to this example. According to an alternative embodiment, the foreign-material trap unit 10 may be installed in an enclosure shaped like a bell.

Figure 2:
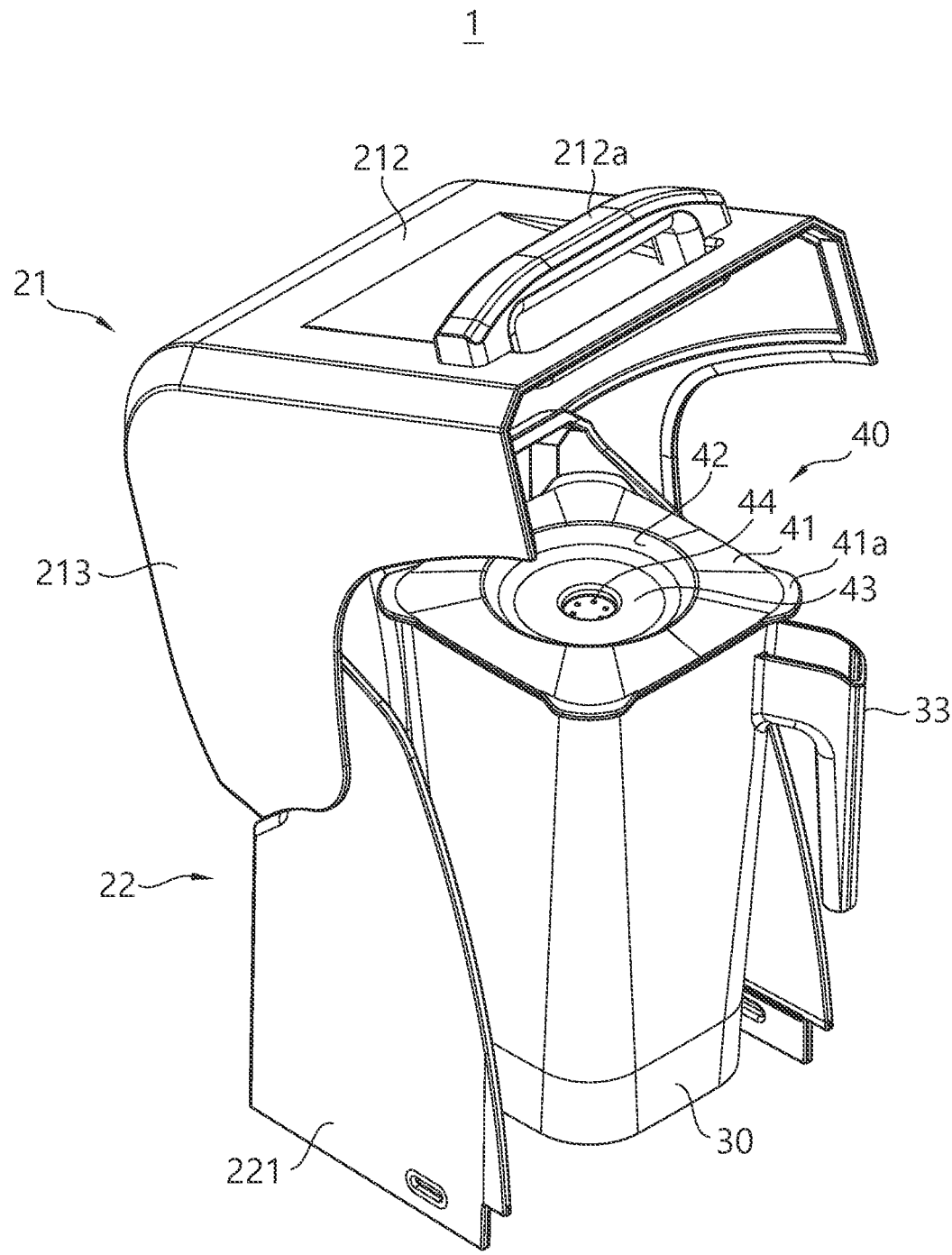
FIG. 2 is a perspective view showing that an upper enclosure is opened in a food processor according to an embodiment of the disclosure.
Figure 3:
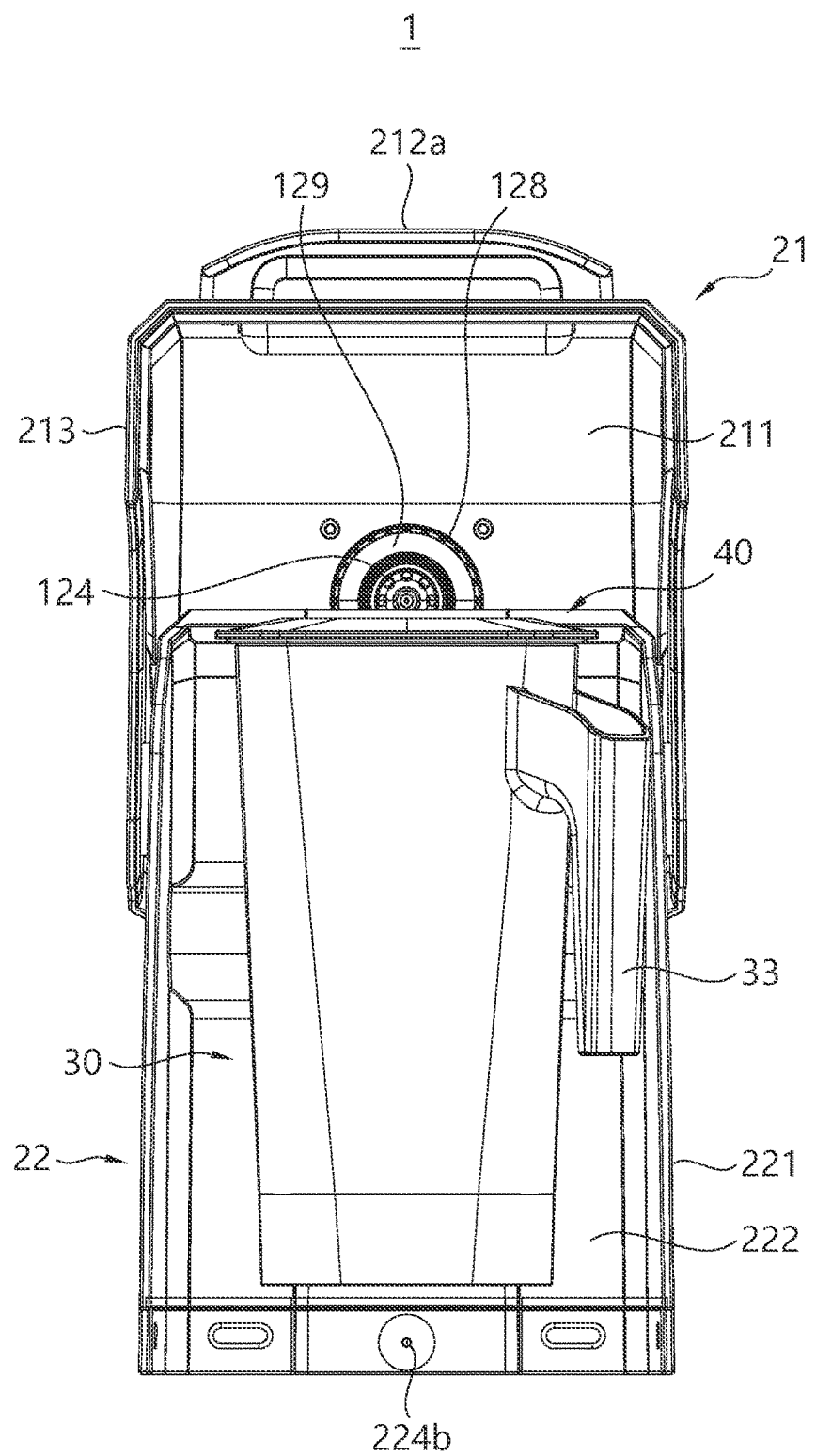
FIG. 3 is a front view showing that an upper enclosure is opened in a food processor according to an embodiment of the disclosure.
Figure 4:
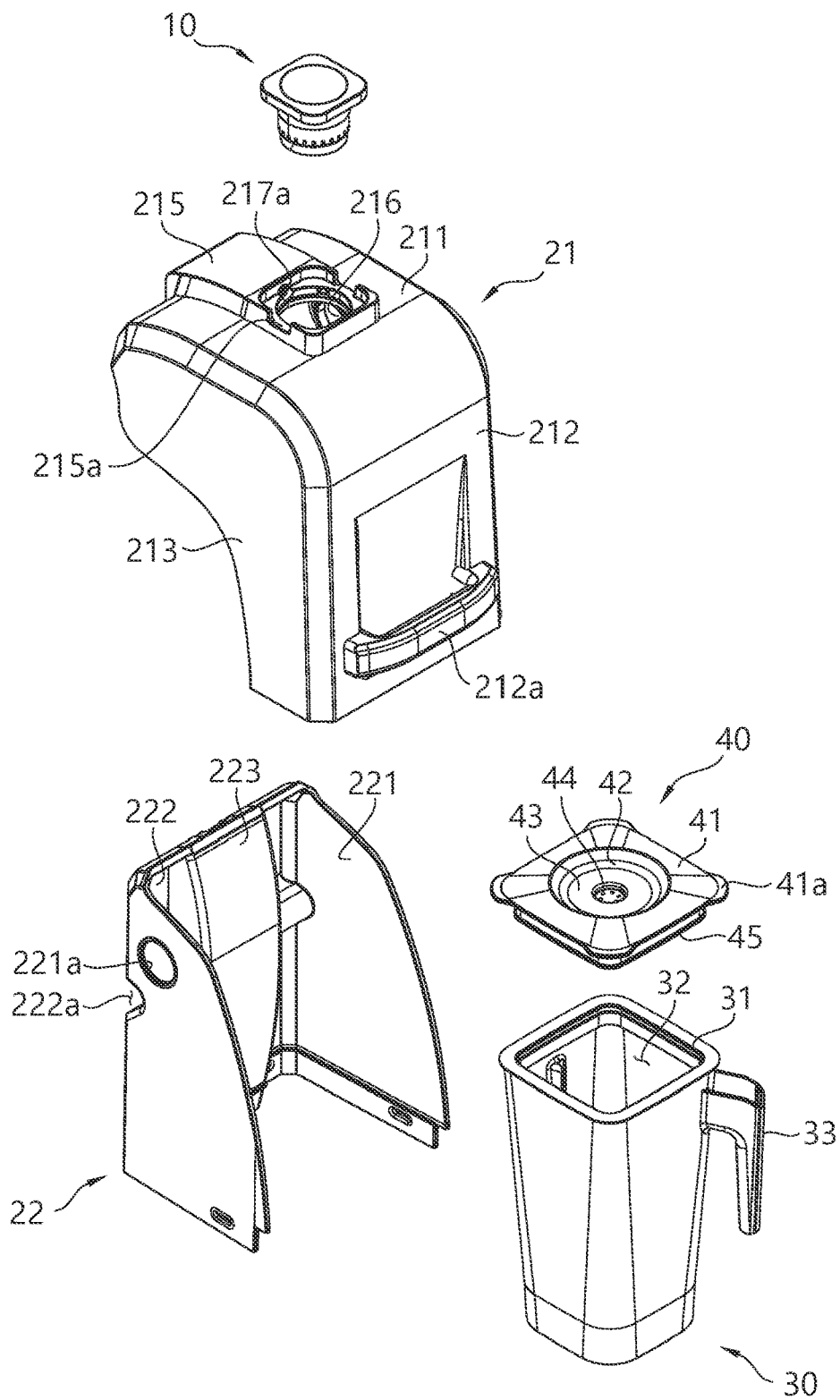
FIG. 4 is an exploded perspective view of a food processor according to an embodiment of the disclosure.

FIG. 2 is a perspective view showing that an upper enclosure is opened in a food processor according to an embodiment of the disclosure, FIG. 3 is a front view showing that the upper enclosure is opened in the food processor according to an embodiment of the disclosure, and FIG. 4 is an exploded perspective view of the food processor according to an embodiment of the disclosure.

As shown in FIGS. 2 to 4, the food processor 1 according to an embodiment of the disclosure includes a container 30 and a lid 40.

The container 30 includes an opening 31 formed at the top, through which food or the like object to be processed can be introduced, and an accommodating space 32 in which the food or the like object to be processed is accommodated through the opening 31. The container 30 may be formed with a handle 33 at one side thereof. When the container 30 is approximately shaped like a rectangular prism as shown in FIG. 2 and the like, the handle 33 may be formed at a lateral edge of the container 30. In case where the handle 33 is formed at the lateral edge of the container 30, an edge of the container 30 opposite to the handle 33 serves as a spout when a user grips the handle 33 and pours food from the container 30 into a cup, a bowl or the like, thereby preventing the food from spilling out of the accommodating space 32 as unintended by the user.

Figure 8:
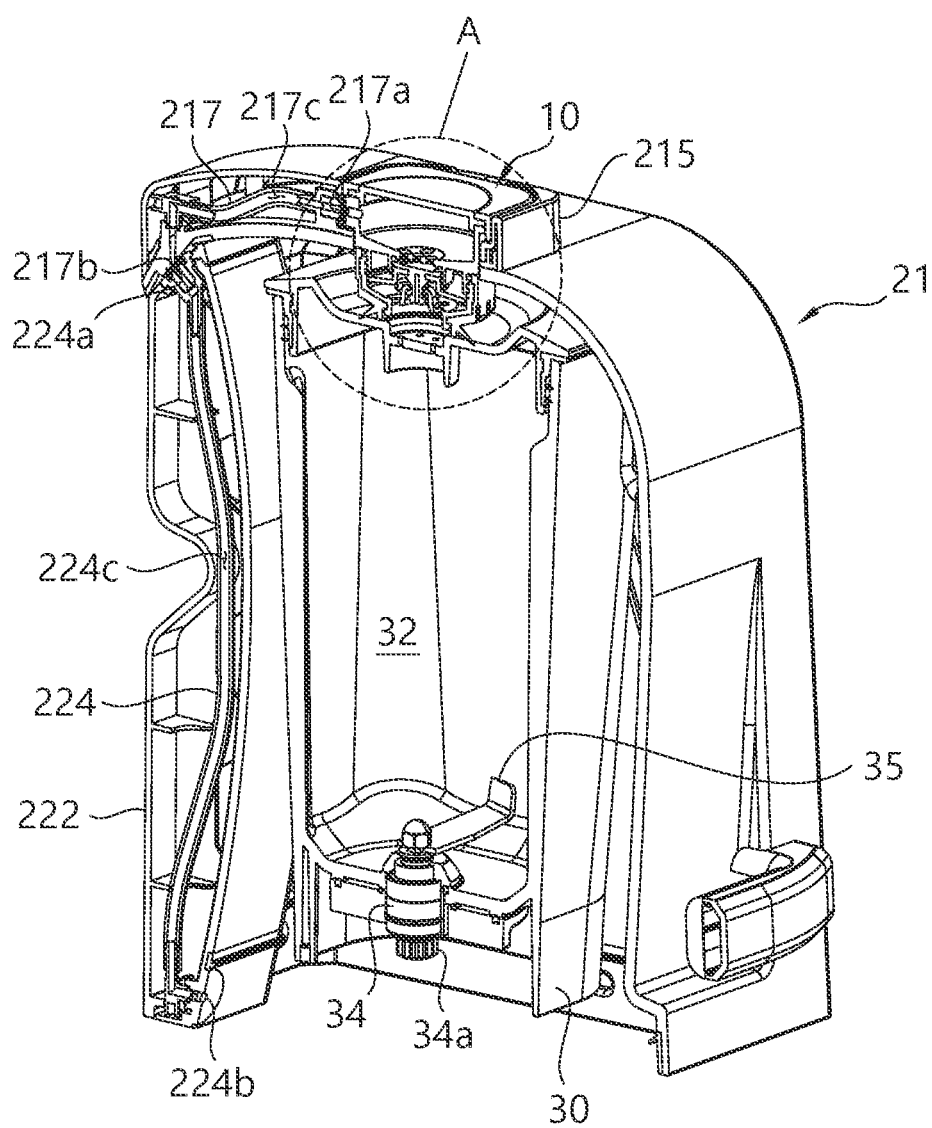
FIG. 8 is a longitudinally cut-open perspective view of a food processor according to an embodiment of the disclosure.

The accommodating space 32 may be internally provided with a processing member 35 for processing an object to be processed (see FIG. 8). The processing member 35 may include a blade or the like for grinding food or the like object to be processed. The processing member 35 is supported on a spin shaft 34 passing through the bottom of the container 30 and spinnable inside the accommodating space 32. The spin shaft 34 exposed below the container 30 may be formed with a gear 34a (see FIG. 8), and the gear 34a may engage with an output shaft (not shown) extended from the motor, which is provided in the base, and exposed above the base, thereby transmitting rotational force from the motor to the spin shaft.

The lid 40 is removably installed in the opening 31 of the container 30. The lid 40 is formed to close the opening 31 while being installed in the container 30.

As shown in FIGS. 2 and 4, the lid 40 includes an upper portion to be settled on the top of the container 30, and a lower portion to be inserted in the container 30 through the opening 31.

The upper portion of the lid 40 includes a first top portion 41, a second top portion 42, and a third top portion 43. The first top portion 41 is annularly shaped forming an top edge of the lid 40, and the third top portion 43 is positioned inside and below the first top portion 41. The second top portion 42 forms an inclined surface connecting the first top portion 41 and the third top portion 43.

The first top portion 41 includes an outer border positioned outside the outer border of the opening 31 of the container 30, and may be approximately shaped like a quadrangle as shown in FIG. 2 and the like. Further, the first top portion 41 may include a protrusion 41a extended outward from each corner thereof. The protrusion 41a may be used as a support point for a finger so that a user can easily pull the lid 40 when the user wants to remove the lid 40 from the container 30.

Meanwhile, the third top portion 43 is centrally formed with a plurality of first exhaust holes 44 forming a first exhaust channel. The first exhaust hole 44 is formed passing through the third top portion 43. In addition, a barrier 46 is extended downward from the bottom of the third top portion 43 while surrounding the plurality of first exhaust holes 44. While gas in the accommodating space 32 is flowing in the plurality of first exhaust holes 44, the inflow of liquid or foreign materials in the accommodating space 32 are primarily blocked by the barrier 46.

Under the lid 40, an insertion portion 45 is extended downward from the bottom of the first top portion 41. The insertion portion 45 is shaped to fit in the opening 31 of the container 30, and may include a sealing member provided on an outer surface of the insertion portion 45 facing an inner surface of the container 30 and improving sealing between the container 30 and the lid 40. According to an alternative embodiment, the sealing member may be provided on the inner surface of the container 30 facing the outer surface of the insertion portion 45.

Figure 5:
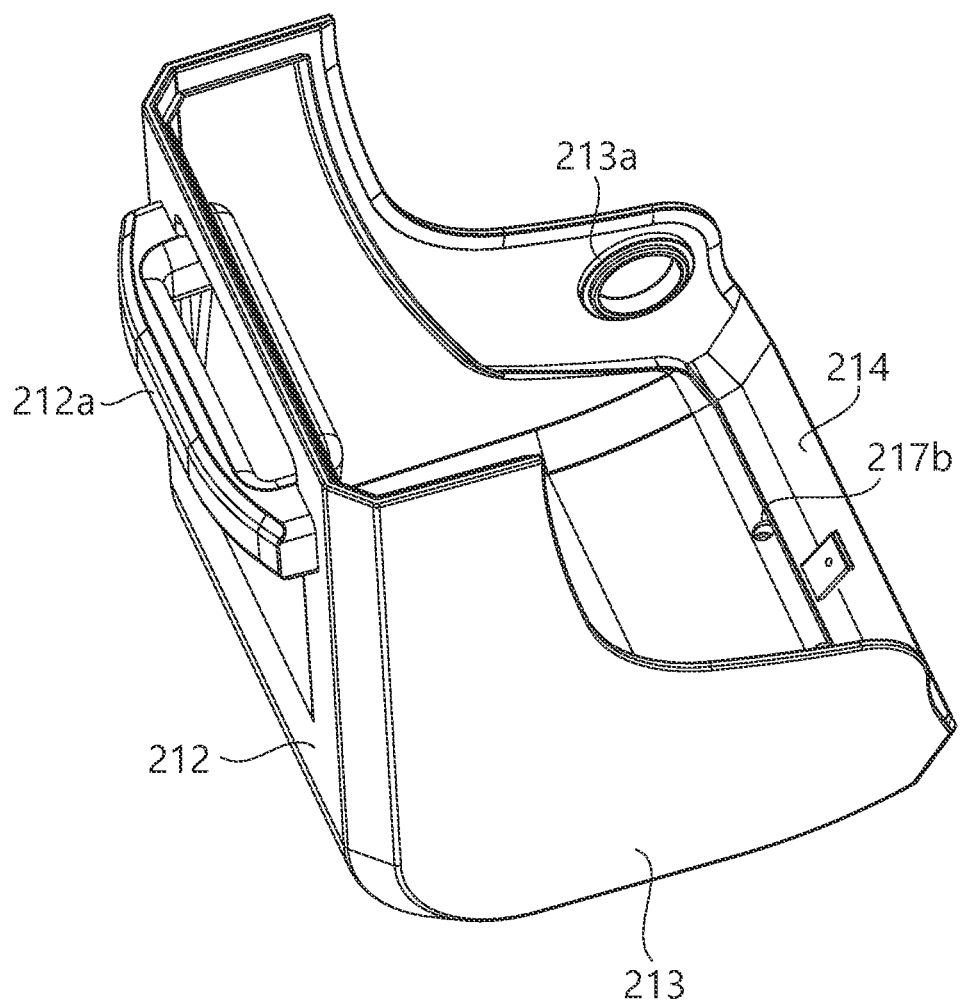
FIG. 5 is perspective view showing a lower side of an upper enclosure of a food processor according to an embodiment of the disclosure.
Figure 6:
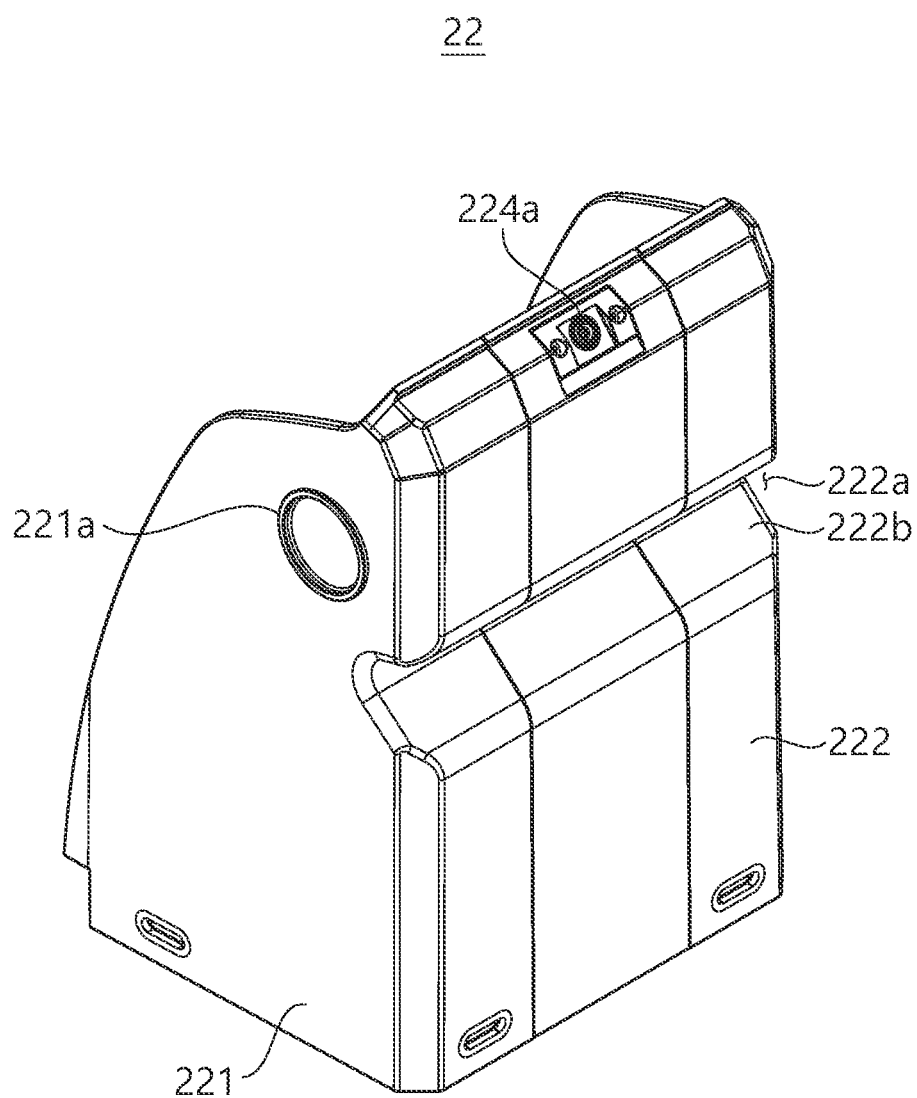
FIG. 6 is a perspective view showing a back side of a lower enclosure in a food processor according to an embodiment of the disclosure.

FIG. 5 is perspective view showing a lower side of an upper enclosure of a food processor according to an embodiment of the disclosure, and FIG. 6 is a perspective view showing a back side of a lower enclosure in a food processor according to an embodiment of the disclosure.

The upper enclosure 21 is formed to partially enclose the upper, front and lateral sides of the container 30, and includes a top portion 211, a front portion 212, lateral portions 213, and a rear portion 214 as shown in FIGS. 2 to 5.

The top portion 211 includes a trap-unit accommodating groove 216 and a first channel accommodating portion 215.

The trap-unit accommodating groove 216 refers to a space in which the foreign-material trap unit 10 to be described later is installed. As shown in FIG. 4, the trap-unit accommodating groove 216 is formed passing through a part of the first channel accommodating portion 215 and the top portion 211, and has a structure that the foreign-material trap unit 10 is detachably fastened/separated.

The first channel accommodating portion 215 accommodates an upper exhaust tube 217 (see FIG. 8) that forms an upper exhaust channel 217c (see FIG. 8). The upper exhaust channel 217c includes a first end 217 formed to be exposed through the inner surface of the trap-unit accommodating groove 216.

As shown in FIG. 4, a grip groove 215a may be formed in a portion of the first channel accommodating portion 215, which forms the periphery of the trap-unit accommodating groove 216, so that a user can grip the lateral side of the foreign-material trap unit 10 with fingers in order to remove the foreign-material trap unit 10.

The front portion 212 is extended downward from the front of the top portion 211, and may include a handle 212a. A user may move the upper enclosure 21 from a closed state (i.e., the state of FIG. 1) to an opened state (i.e., the state of FIG. 2) or from the opened state (i.e., the state of FIG. 2) to the closed state (i.e., the state of FIG. 1) while gripping the handle 212a.

The lateral portions 213 are formed between the front portion 212 and the top portion 211, and may include a front side formed to be longer downward than a back side as shown in FIGS. 2 and 4. As shown in FIG. 5, a rotation engaging portion 213a rotatably coupled to a rotation engaging portion 221a of the lower enclosure 22 (to be described later) is formed in the inner surface of the lateral portion 213. As the rotation engaging portions 213a and 221a rotatably engage with each other, the upper enclosure 21 becomes tiltable with respect to the lower enclosure 22.

As shown in FIG. 5, the rear portion 214 is formed between the top portion 211 and the lateral portion 213s, and shorter than the front portion 212. On the inner surface of the rear portion 214, a second end 217b of the upper exhaust channel 217c is exposed.

The lower enclosure 22 is formed to partially enclose the back and lateral sides of the container 30, and includes a lateral portion 221 and a rear portion 222 as shown in FIGS. 2 to 6.

The rotation engaging portion 221a aforementioned is provided on the outer surface of the lateral portion 221. The lateral portion 221 of the lower enclosure 22 partially overlaps with the lateral portion 213 of the upper enclosure 21. When the upper enclosure 21 is in the closed state, the lateral sides of the container 30 are entirely enclosed with the lateral portion 221 of the lower enclosure 22 and the lateral portion 213 of the upper enclosure 21. The inner surface of the lateral portion 213 of the upper enclosure 21 may be structured to be partially adjacent to the outer surface of the lateral portion 221 of the lower enclosure 22.

As shown in FIGS. 4 and 6, the rear portion 222 is formed to connect both the lateral portions 221. The rear portion 222 includes a second channel accommodating portion 223, a tilt limiting groove 222a, and a tilt limiting surface 222b.

As shown in FIG. 6, the outer surface of the rear portion 222 is partially recessed to form the tilt limiting groove 222a. The tilt limiting groove 222a refers to a space in which the rear portion 214 of the upper enclosure 21 is accommodated when the upper enclosure 21 is in the opened state as shown in FIG. 2. The tilt limiting surface 222b may be formed as a downward inclined surface facing backward, while forming a bottom portion shaped to define the tilt limiting groove 222a. The tilt limiting surface 222b supports the rear portion 214 when the upper enclosure 21 is in the opened state, thereby setting a tilt limit of the upper enclosure 21 when the upper enclosure 21 is in the opened state.

The second channel accommodating portion 223 accommodates a lower exhaust tube 224 (see FIG. 8) that forms a lower exhaust channel 224c (see FIG. 8). The lower exhaust channel 224c includes a first end 224a formed to be exposed through a top side on the outer surface of the rear portion 222 as shown in FIG. 6, and a second end 224b formed to be exposed through a bottom side on the inner surface of the rear portion 222 as shown in FIG. 3.

The first end 224a of the lower exhaust channel 224c and the second end 217b of the upper exhaust channel 217c are aligned with each other when the upper enclosure 21 is in the closed state. To seal a space between the first end 224a of the lower exhaust channel 224c and the second end 217b of the upper exhaust channel 217c, an O-ring or the like sealing member may be provided in the first end 224a of the lower exhaust channel 224c and/or the second end 217b of the upper exhaust channel 217c.

The first end 224a of the lower exhaust channel 224c is formed to be exposed on the outer surface of the rear portion 222, and the second end 217b of the upper exhaust channel 217c provided in the upper enclosure 21 is formed to be exposed on the inner surface of the rear portion 214, so that the first end 224a of the lower exhaust channel 224c and the second end 217b of the upper exhaust channel 217c can be automatically connected and sealed when the upper enclosure 21 moves from the opened state to the closed state. On the other hand, when the upper enclosure 21 moves from the closed state to the opened state, the first end 224a of the lower exhaust channel 224c and the second end 217b of the upper exhaust channel 217c are automatically disconnected.

Further, the second end 224b of the lower exhaust channel 224c is connected to an end of a vacuum channel (not shown) exposed as formed in the base. The vacuum channel is connected to the vacuum pump provided in the base and transmits vacuum pressure generated by the vacuum pump to the lower exhaust channel 224c.

Because the second end 224b of the lower exhaust channel 224c is formed to be exposed through the bottom side on the inner surface of the rear portion 222, the second end 224b of the lower exhaust channel 224c and the end of the vacuum channel exposed as formed in the base are automatically connected and sealed when the lower enclosure 22 is mounted to the base.

As shown in FIGS. 1 and 4, the foreign-material trap unit 10 is detachably mounted to the trap-unit accommodating groove 216 of the upper enclosure 21. Below, the foreign-material trap unit 10 will be described in detail.

Figure 7:
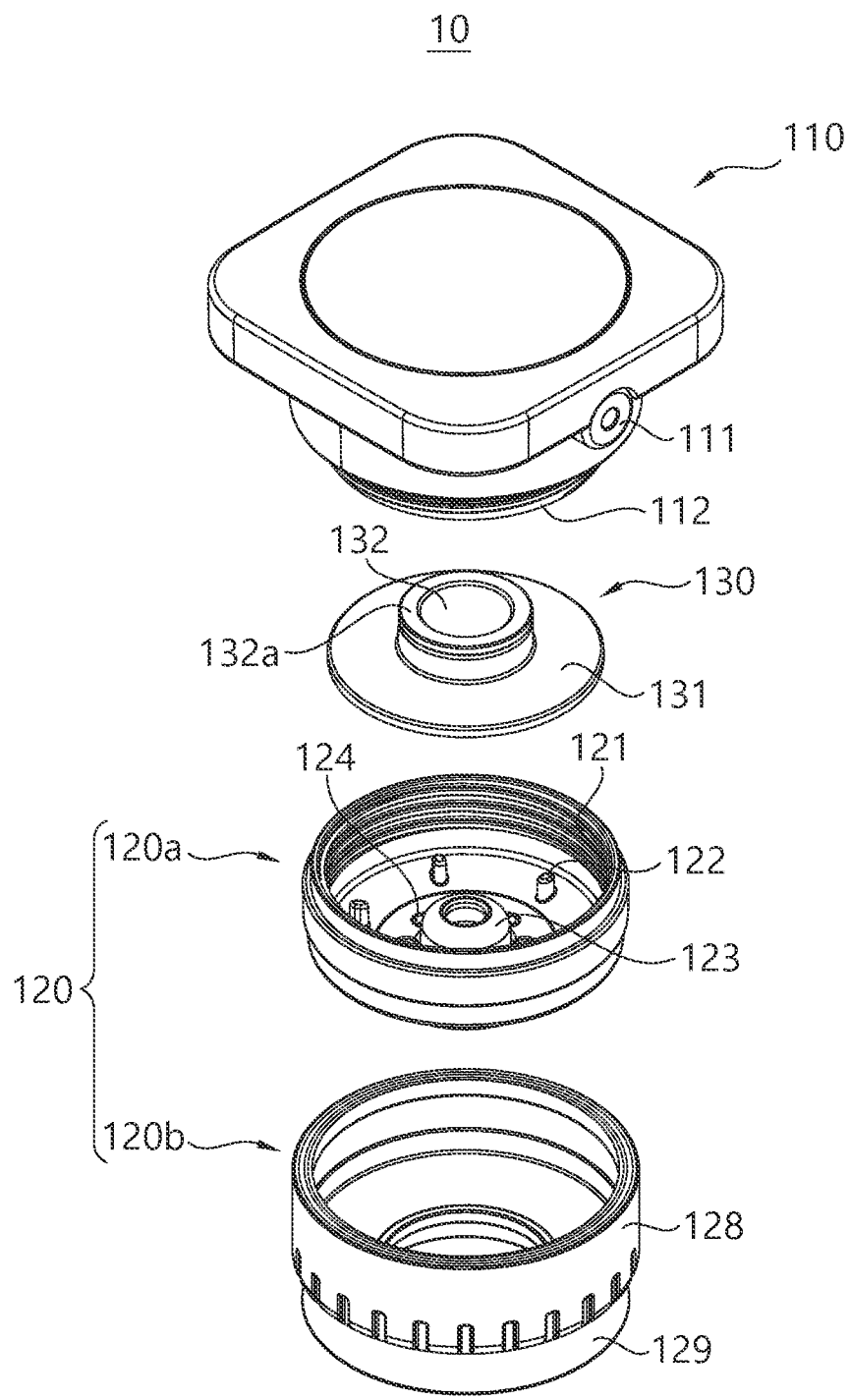
FIG. 7 is an exploded perspective view of a foreign-material trap unit in a food processor according to an embodiment of the disclosure.
Figure 9:
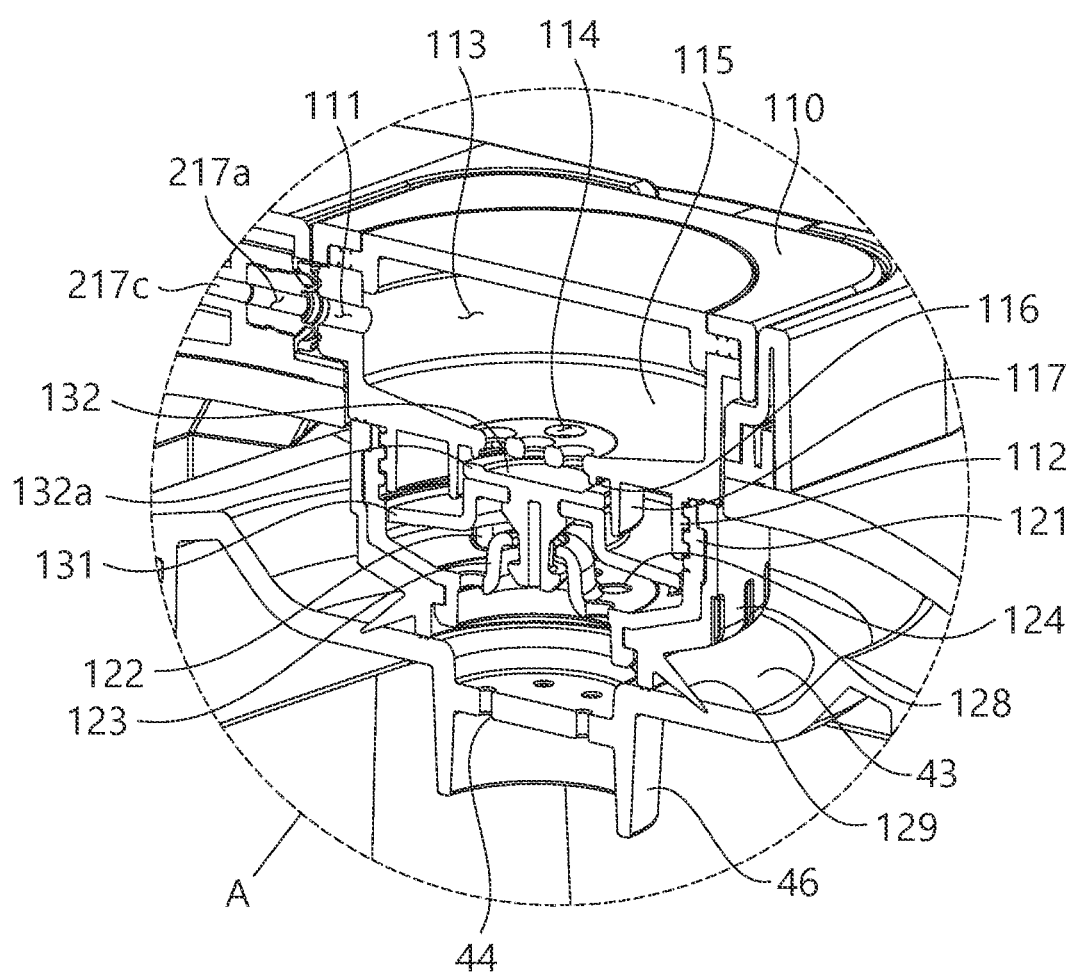
FIG. 9 is an enlarged view of 'A' in FIG. 8.

FIG. 7 is an exploded perspective view of a foreign-material trap unit in a food processor according to an embodiment of the disclosure, FIG. 8 is a longitudinally cut-open perspective view of a food processor according to an embodiment of the disclosure, and FIG. 9 is an enlarged view of 'A' in FIG. 8.

As shown in FIG. 7, the foreign-material trap unit 10 includes an upper member 110, a movable member 130, and a lower member 120.

The upper member 110 has a gas-liquid separating space 113 therein, and includes a second exhaust hole 111 formed to communicate with the gas-liquid separating space 113 at one lateral side. The second exhaust hole 111 may be spaced apart at a predetermined height from a bottom surface 115 of the gas-liquid separating space 113.

The bottom surface 115 of the gas-liquid separating space 113 is centrally formed with a plurality of upper intake holes 114. The bottom surface 115 of the gas-liquid separating space 113 may be inclined downward toward the plurality of upper intake holes 114.

With this structure, even when liquid is introduced into the gas-liquid separating space 113 through the upper intake hole 114, the liquid falls down again through the upper intake hole 114 due to the liquid's own weight and only gas is discharged from the gas-liquid separating space 113 through the second exhaust hole 111 because the second exhaust hole 111 is positioned above the predetermined height from the bottom surface 115.

As shown in FIG. 9, a first downward protruding ring 116, a second downward protruding ring 117, and a coupling ring 112 are extended downward from the bottom of the bottom surface 115. The first downward protruding ring 116 is formed to surround the plurality of upper intake holes 114, and the second downward protruding ring 117 is formed to surround the first downward protruding ring 116. The second first downward protruding ring 117 is formed to protrude further downward than the first downward protruding ring 116. The coupling ring 112 is formed to surround the second downward protruding ring 117.

The lower member 120 includes a supporting member 120a, and a connecting member 120b.

The supporting member 120a supports the movable member 130 (to be described later) to be movable up and down. The supporting member 120a forms a space opened upward and accommodating the movable member 130, and is formed with a coupling ring 121, to which the coupling ring 112 of the upper member 110 detachably coupled, at an upper side of a lateral wall portion thereof.

The supporting member 120a is centrally provided with a supporting portion 123 on a bottom portion thereof to support a core portion 132 of the movable member 130 to be movable up and down. The supporting portion 123 may protrude upward from the bottom portion of the supporting member 120a, and accommodate the bottom of the core portion 132. A complementary structure is provided between the bottom of the core portion 132 and the supporting portion 123 so that the core portion 132 can move up and down within a predetermined range without being easily separated from the supporting portion 123.

As shown in FIGS. 7 and 9, a lower intake hole 124 is formed around the supporting portion 123 while passing up and down through the bottom portion of the supporting member 120a.

As shown in FIG. 7, a projection 122 protruding upward from the bottom portion of the supporting member 120a is provided around the lower intake hole 124 so as to support the blocking plate 131 of the movable member 130. The projection 122 prevents the blocking plate 131 of the movable member 130 from being in close contact with the bottom portion of the supporting member 120a.

As shown in FIG. 9, a downward inclined surface facing the lower intake hole 124 is formed between the lateral wall portion and the bottom portion of the supporting member 120a. The downward inclined surface makes liquid introduced into the supporting member 120a flow down into the lower intake hole 124 due to the liquid's own weight.

The connecting member 120b includes a coupling portion 128 enclosing the supporting member 120a and coupled to the supporting member 120a, and an annular close-contact portion 129 extended downward from the coupling portion 128.

As shown in FIGS. 8 and 9, the close-contact portion 129 of the foreign-material trap unit 10 coupled to the upper enclosure 21 being in the closed state is in close contact with the third top portion 43 of the lid 40. Because the close-contact portion 129 is in close contact with the third top portion 43 while surrounding the plurality of first exhaust holes 44, the plurality of first exhaust holes 44 and the lower intake hole 124 are sealed.

The coupling portion 128 and the close-contact portion 129 may be formed as a single body, and may be made of a resilient material to prevent a leak between the close-contact portion 129 and the third top portion 43 of the lid 40.

The movable member 130 includes the core portion 132 and the blocking plate 131.

The bottom of the core portion 132 is coupled to the supporting portion 123 of the lower member 120 and movable up and down as described above, and the top of the core portion 132 is adjacent to the plurality of upper intake holes 114 and the first downward protruding ring 116 of the upper member 110. On the rim of the top of the core portion 132, a protruding rim 132a may be formed facing the first downward protruding ring 116 and protruding further upward than the center of the top of the core portion 132.

The blocking plate 131 is radially extended from the core portion 132, and positioned below the second downward protruding ring 117 as shown in FIG. 9. The circumference of the blocking plate 131 is formed to be adjacent to the inner surface of the lower member 120.

With the foregoing structure, the foreign-material trap unit 10 forms a connection channel that runs from the lower intake hole 124 to the second exhaust hole 111 via a space between the blocking plate 131 and the inner surface of the lower member 120, a space between the second downward protruding ring 117 and the blocking plate 131, a space between the protruding rim 132a and the first downward protruding ring 116, the upper intake hole 114, and the gas-liquid separating space 113.

Below, a vacuumizing process of the food processor 1, an opening/closing operation of the upper enclosure 21, etc. will be described based on the foregoing structure of the food processor 1 according to an embodiment of the disclosure.

As shown in FIGS. 1 and 8, when the foreign-material trap unit 10 is coupled to the upper enclosure 21, the first end 217a of the upper exhaust channel 217c and the second exhaust hole 111 of the foreign-material trap unit 10 are connected without a leak, thereby connecting the upper exhaust channel 217c and the connection channel.

When the upper enclosure 21 is in the closed state, the upper exhaust channel 217c and the lower exhaust channel 224c are connected to form the second exhaust channel without a leak, and the close-contact portion 129 of the foreign-material trap unit 10 and the top surface of the lid 40 are connected without a leak, thereby connecting the connection channel and the first exhaust channel.

Although it is not illustrated, the lower exhaust channel 224c is connected to the vacuum channel of the base without a leak in the state that the lower enclosure 22 is installed in the base.

When the vacuum pump operates in this state, gas of the accommodating space 32 flows in the plurality of first exhaust holes 44 because the second exhaust channel—the connection channel—the first exhaust channel—the accommodating space 32 are connected without a leak.

While gas in the accommodating space 32 flows in the plurality of first exhaust holes 44, the liquid or foreign materials in the accommodating space 32 are primarily prevented by the barrier 46 from flowing in the first exhaust hole 44.

Gas passed through the first exhaust hole 44 goes through the connection channel of the foreign-material trap unit 10. Specifically, the gas passed through the first exhaust hole 44 passes through the plurality of lower intake holes 124, passes between the blocking plate 131 and the inner surface of the lower member 120, passes between the second downward protruding ring 117 and the blocking plate 131, passes between the protruding rim 132a and the first downward protruding ring 116, passes through the upper intake hole 114, and then enters the gas-liquid separating space 113, and goes to the second exhaust channel through the second exhaust hole 111.

While the inside of the accommodating space 32 is subjected to the vacuum exhaust, the liquid or the like in the accommodating space 32 may pass through the first exhaust hole 44 and be introduced into the foreign-material trap unit 10. For example, food ingredients splashing during food processing may be introduced into the first exhaust hole 44, or bubbles generated during food processing may rise and be introduced into the first exhaust hole 44.

When liquid or the like foreign materials reach the vacuum pump, the vacuum pump is likely to be damaged. Therefore, the foreign-material trap unit 10 blocks the liquid or the like foreign materials from being introduced into the vacuum pump.

When solid foreign materials pass through the first exhaust hole 44 and the lower intake hole 124, the solid foreign materials are blocked by the blocking plate 131 because of a narrow space between the blocking plate 131 and the inner surface of the lower member 120, and eventually left on the bottom surface of the lower member 120 as falling toward the lower intake hole 124 due to their own weight, or fall toward the lid 40 through the lower intake hole 124.

When a large amount of liquid from the accommodating space 32 is introduced by vacuum pressure into the foreign-material trap unit 10 through the first exhaust hole 44 and the lower intake hole 124 and thus the space between the bottom surface of the lower member 120 and the blocking plate 131 is full of the liquid, buoyancy exerted by the liquid causes the movable member 130 to rise so that the protruding rim 132a and the first downward protruding ring 116 and/or the blocking plate 131 and the second downward protruding ring 117 can come into contact with each other, thereby blocking the connection channel, preventing the liquid from passing through the connection channel, and stopping the vacuum exhaust.

When a small amount of liquid from the accommodating space 32 is introduced into the foreign-material trap unit 10 through the first exhaust hole 44 and the lower intake hole 124, most of the liquid collides with the bottom surface of the blocking plate 131 and falls due to its own weight, thereby being left on the bottom surface of the lower member 120 or falling toward the lid 40 by passing through the lower intake hole 124.

However, a small amount of liquid may be partially introduced by the vacuum pressure into the space between the blocking plate 131 and the inner surface of the lower member 120. In this case, the space between the blocking plate 131 and the inner surface of the lower member 120 is so narrow that a small amount of liquid cannot pass through this space but forms a water film. When the water film is formed between the blocking plate 131 and the inner surface of the lower member 120, it has the same effect as if the connection channel is closed, thereby moving the movable member 130 up due to the vacuum pressure, and blocking the connection channel as the protruding rim 132a and the first downward protruding ring 116 and/or the blocking plate 131 and the second downward protruding ring 117 come into contact with each other.

As a result, the foreign-material trap unit 10 prevents foreign materials from entering and damaging the vacuum pump by blocking the foreign materials passed through the first exhaust channel from being introduced into the second exhaust channel, and allowing the food processor 1 to be hygienically used by preventing the foreign materials from being introduced into the second exhaust channel that is not easily separated/cleaned as accommodated in the enclosure 20.

Below, a food processor according to an alternative embodiment of the disclosure will be described. For convenience of description, like numerals will be used to describe like elements to those of the foregoing embodiments, and repetitive descriptions to those of the foregoing embodiments will be avoided.

Figure 10:
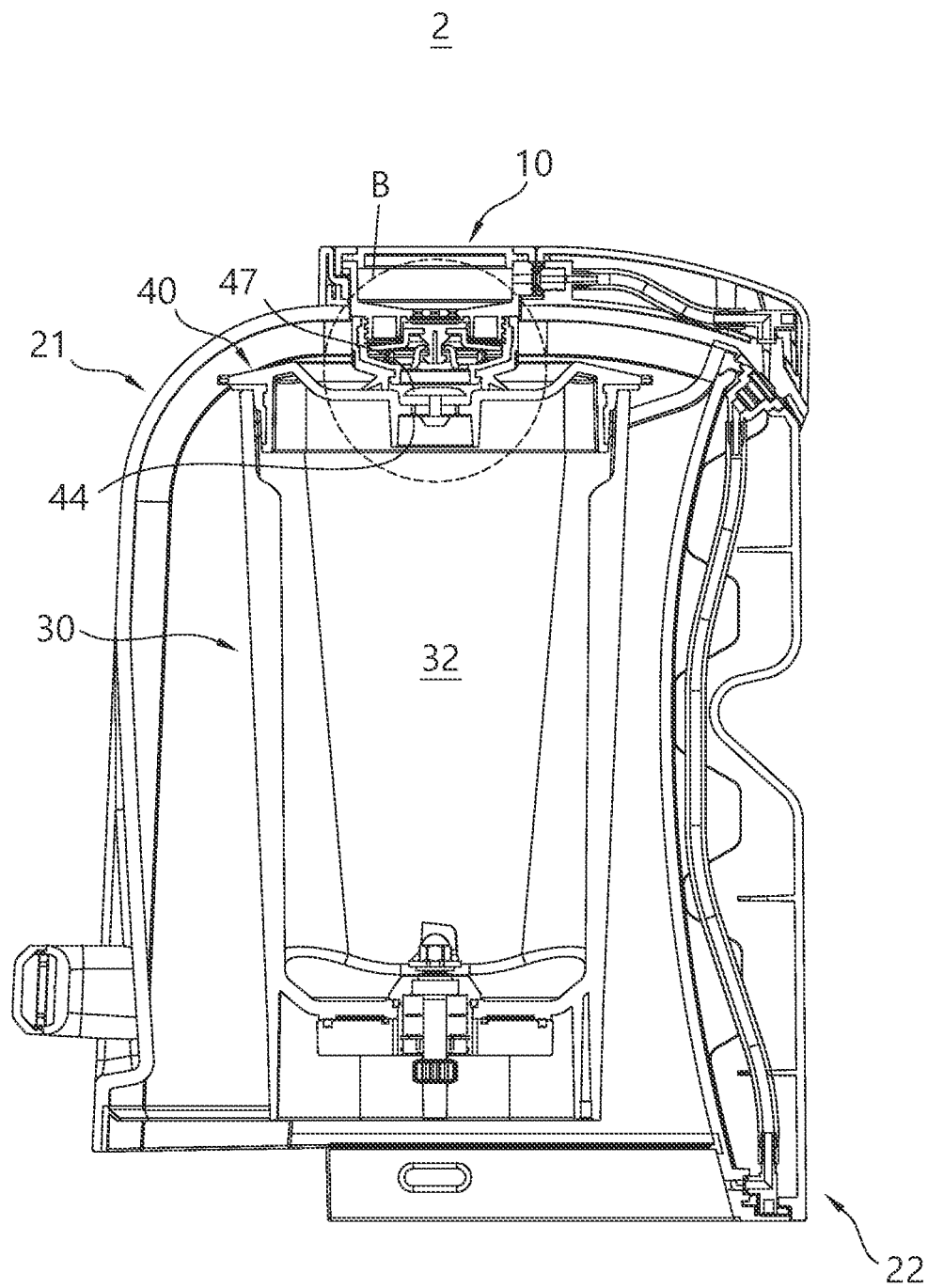
FIG. 10 is a longitudinal-section view of a food processor according to another embodiment of the disclosure.
Figure 11:
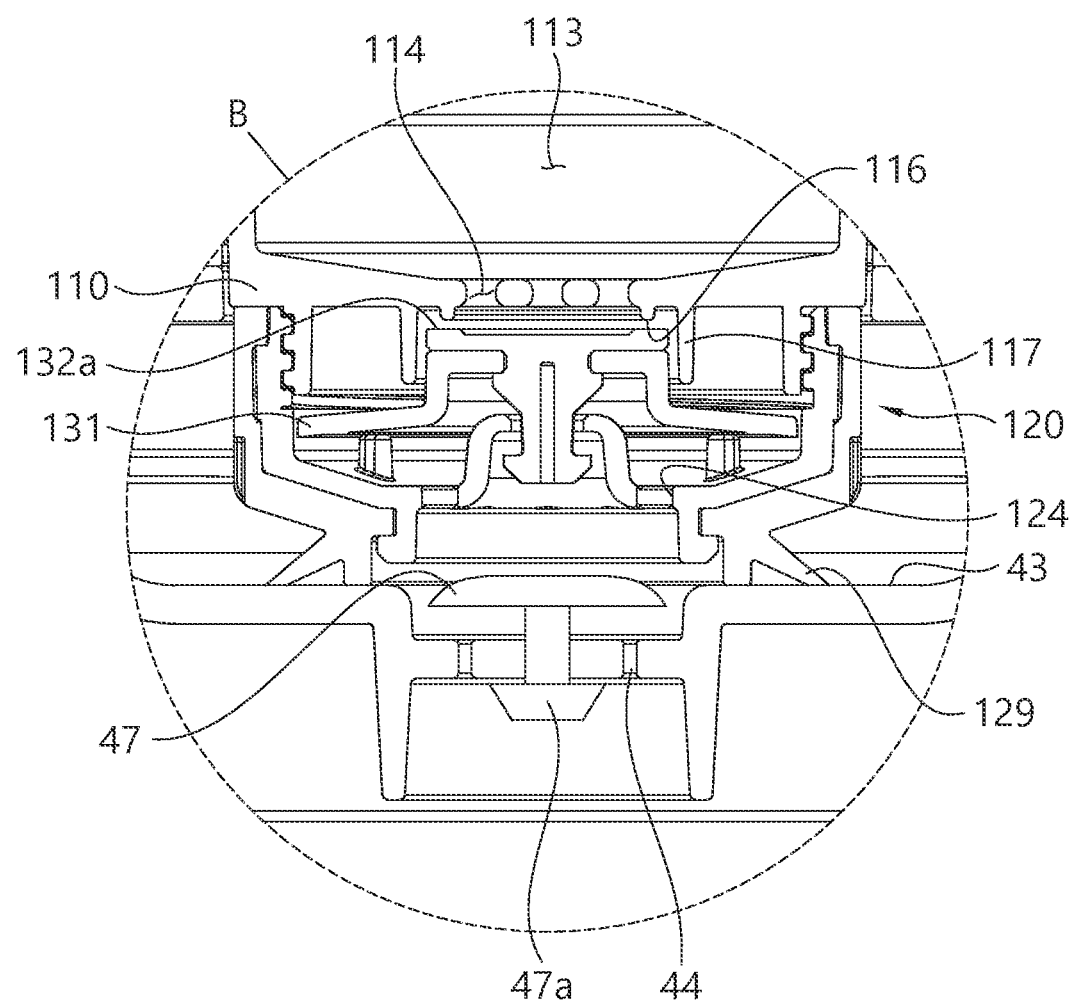
FIG. 11 is an enlarged view of 'B' in FIG. 10 in a vacuum exhaust state.
Figure 12:
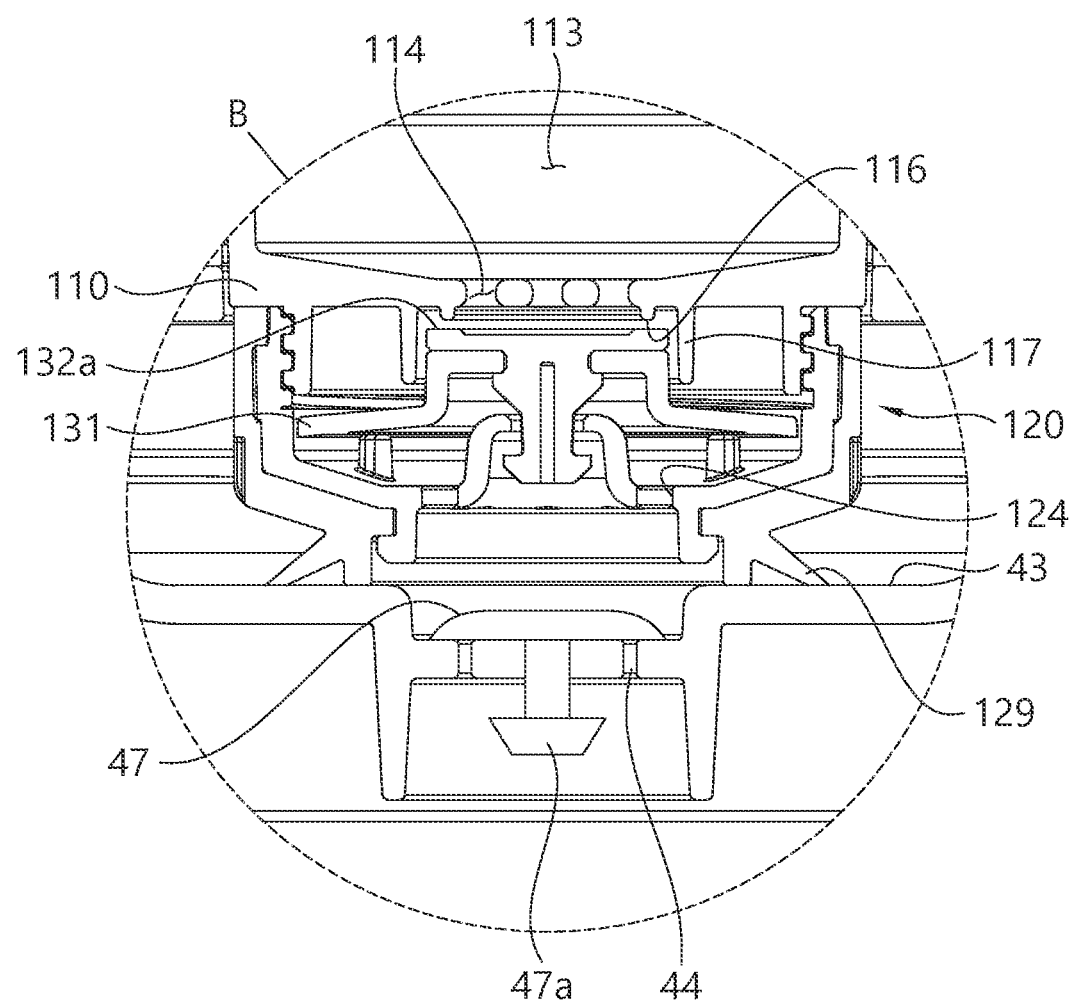
FIG. 12 is an enlarged view of 'B' in FIG. 10 in a state that vacuum exhaust is completed.

FIG. 10 is a longitudinal-section view of a food processor according to another embodiment of the disclosure, FIG. 11 is an enlarged view of '13' in FIG. 10 in a vacuum exhaust state, and FIG. 12 is an enlarged view of 'B' in FIG. 10 in a state that vacuum exhaust is completed.

As shown in FIGS. 10 to 12, a food processor 2 according to this embodiment of the disclosure further includes a check valve 47 in the lid 40 as compared to the food processor 1 according to the foregoing embodiment.

As shown in FIGS. 11 and 12, the check valve 47 passes through a central portion of the third top portion 43 formed with the first exhaust holes 44 and is movable up and down within a predetermined range, thereby opening and closing the first exhaust hole 44.

As shown in FIG. 12, a top portion of the check valve 47 exposed above the third top portion 43 is formed to have an area enough to cover all the first exhaust hole 44.

As shown in FIG. 11, a stopper 47b may be formed at a lower end of the check valve 47, which is positioned below the third top portion 43, in order to prevent the check valve 47 from rising and coming off while the first exhaust holes 44 are opened.

When the vacuum pump operates in the state that the close-contact portion 129 of the foreign-material trap unit 10 is in close contact with the third top portion 43 of the lid 40, the check valve 47 moves up by the vacuum pressure as shown in FIG. 11 and the first exhaust holes 44 are opened, so that gas of the accommodating space 32 can be discharged through the plurality of first exhaust holes 44 and then pass through the plurality of lower intake holes 124, pass through the space between the blocking plate 131 and the inner surface of the lower member 120, passes through the space between the second downward protruding ring 117 and the blocking plate 131, pass the space between the protruding rim 132a and the first downward protruding ring 116, pass through the upper intake hole 114, and enter the gas-liquid separating space 113, and go to the second exhaust channel through the second exhaust hole 111.

When the vacuum pump stops operating and the space between the foreign-material trap unit 10 and the lid 40, specifically, a space above the third top portion 43 enclosed by the close-contact portion 129 is increased in pressure, the check valve 47 moves down as shown in FIG. 12 due to difference in pressure between the space above the third top portion 43 and the accommodating space 32 and closes the first exhaust holes 44 as the top portion of the check valve 47 comes into close contact with the first exhaust hole 44, thereby maintaining the inside of the accommodating space 32 under negative pressure.

Although the foreign-material trap unit 10 and the lid 40 are separated as the upper enclosure 21 is opened with respect to the lower enclosure 22, the first exhaust holes 44 are kept closed by the check valve 47, so that the food processor 2 according to this embodiment can maintain the accommodating space 32 under the negative pressure.

It will be understood by a person having ordinary knowledge in the art to which the disclosure pertains that the disclosure may be embodied in other specific forms without changing the technical spirit or essential features. Therefore, it should be understood that the foregoing embodiments are for illustrative purposes only and not restricted in all aspects. The scope of the disclosure is defined by the following claims rather than the foregoing detailed description, and all changes or modifications from the meaning and scope of the claims and their equivalents should be construed as being included in the scope of the disclosure.

[Mode for Carrying out Disclosure]

A food processor according to an embodiment of the disclosure includes: a container comprising an opening formed at a top, through which food is introduced, and an accommodating space in which the food introduced through the opening is accommodated; a lid removably coupled to the container to allow the opening to be opened and closed, and comprising a first exhaust channel formed to communicate with the accommodating space when coupled to the container; an enclosure provided to at least partially enclose the container and the lid, and comprising a second exhaust channel communicating with the first exhaust channel; a vacuum pump connected to the second exhaust channel; and a foreign-material trap unit provided between the first exhaust channel and the second exhaust channel and preventing foreign materials introduced into the first exhaust channel from being introduced into the second exhaust channel while gas in the accommodating space is discharged by the vacuum pump.

The foreign-material trap unit may be detachably installed in the enclosure.

The enclosure may include a trap-unit accommodating groove in which the foreign-material trap unit is detachably installed, the second exhaust channel may include a first end exposed on a lateral side of the trap-unit accommodating groove, and the foreign-material trap unit may include an exhaust hole at one side thereof, to which the first end of the second exhaust channel while being coupled to the enclosure.

The enclosure may include a lower enclosure and an upper enclosure tiltable within a predetermined angle range with respect to the lower enclosure, the upper enclosure may include a trap-unit accommodating groove in which the foreign-material trap unit is detachably installed, the second exhaust channel may include a first end exposed on a lateral side of the trap-unit accommodating groove, and the foreign-material trap unit may include an exhaust hole at one side thereof, to which the first end of the second exhaust channel is connected while being coupled to the enclosure.

The second exhaust channel may include an upper exhaust channel formed to pass through the upper enclosure; and a lower exhaust channel formed to pass through the lower enclosure.

The upper exhaust channel may be connected to the lower exhaust channel when the upper enclosure is in a closed state with respect to the lower enclosure, and disconnected from the lower exhaust channel when the upper enclosure is in an opened state with respect to the lower enclosure.

The lower exhaust channel may include an upper end exposed on a top portion of the lower enclosure, and the upper exhaust channel may include a lower end exposed on a bottom portion of the upper enclosure.

The foreign-material trap unit may include: a lower member settled on a top surface of the lid and including an intake hole formed to communicate with the first exhaust channel; an upper member at least partially forming a guide channel for guiding gas introduced through the intake hole toward the second exhaust channel; and a movable member provided to be movable up and down between the upper member and the lower member and closing the guide channel as moved up by liquid introduced in between the upper member and the lower member through the intake hole.

The movable member may move up based on buoyancy exerted by the liquid and close the guide channel.

The movable member may include a blocking plate of which circumference is adjacent to an inner surface of the lower member, and the movable member may move up based on vacuum pressure transmitted through the guide channel and close the guide channel when liquid introduced through the intake hole is filled between the circumference of the blocking plate and the inner surface of the lower member.

The guide channel may partially include a space between a top surface of the movable member and a bottom surface of the upper member.

The lower member may include an annular close-contact portion to come into contact with the top surface of the lid while surrounding the first exhaust channel so as to seal a space between the intake hole and the first exhaust channel.

The invention claimed is:

1. A food processor comprising:
    a container comprising an opening formed at a top, through which food is introduced, and an accommodating space in which the food introduced through the opening is accommodated;
    a lid removably coupled to the container to allow the opening to be opened and closed, and comprising a first exhaust channel formed to communicate with the accommodating space when coupled to the container;
    an enclosure provided to at least partially enclose the container and the lid, and comprising a second exhaust channel communicating with the first exhaust channel;
    a vacuum pump connected to the second exhaust channel; and
    a foreign-material trap unit provided between the first exhaust channel and the second exhaust channel and preventing foreign materials introduced into the first exhaust channel from being introduced into the second exhaust channel while gas in the accommodating space is discharged by the vacuum pump,
    wherein the enclosure further comprises a trap-unit accommodating groove provided on an outside and in which the foreign-material trap unit is detachably installed, and
    wherein a first end of the first exhaust channel and a first end of the second exhaust channel are exposed toward the trap-unit accommodating groove.

2. The food processor according to claim 1, wherein the foreign-material trap unit comprises an exhaust hole at one side thereof, to which the first end of the second exhaust channel is connected while being coupled to the enclosure.

3. The food processor according to claim 1, wherein the enclosure comprises a lower enclosure and an upper enclosure tiltable within a predetermined angle range with respect to the lower enclosure, the upper enclosure comprises the trap-unit accommodating groove, and the foreign-material trap unit comprises an exhaust hole at one side thereof, to which the first end of the second exhaust channel is connected while being coupled to the enclosure.

4. The food processor according to claim 3, wherein the second exhaust channel comprises:
    an upper exhaust channel formed to pass through the upper enclosure, and
    a lower exhaust channel formed to pass through the lower enclosure.

5. The food processor according to claim 4, wherein the upper exhaust channel is connected to the lower exhaust channel when the upper enclosure is in a closed state with respect to the lower enclosure, and disconnected from the lower exhaust channel when the upper enclosure is in an opened state with respect to the lower enclosure.

6. The food processor according to claim 5, wherein the lower exhaust channel comprises an upper end exposed on a top portion of the lower enclosure, and the upper exhaust channel comprises a lower end exposed on a bottom portion of the upper enclosure.

7. The food processor according to claim 1, wherein the foreign-material trap unit comprises:
    a lower member settled on a top surface of the lid and comprising an intake hole formed to communicate with the first exhaust channel;

an upper member at least partially forming a connection channel for guiding gas introduced through the intake hole toward the second exhaust channel; and a movable member provided to be movable up and down between the upper member and the lower member and closing the connection channel as moved up by liquid introduced in between the upper member and the lower member through the intake hole.

8. The food processor according to claim 7, wherein the movable member moves up based on buoyancy exerted by the liquid and closes the connection channel.

9. The food processor according to claim 7, wherein
the movable member comprises a blocking plate of which circumference is adjacent to an inner surface of the lower member, and
the movable member moves up based on vacuum pressure transmitted through the connection channel and closes the connection channel when liquid introduced through the intake hole is filled between the circumference of the blocking plate and the inner surface of the lower member.

10. The food processor according to claim 7, wherein the connection channel partially comprises a space between a top surface of the movable member and a bottom surface of the upper member.

11. The food processor according to claim 7, wherein the lower member comprises an annular close-contact portion to come into contact with the top surface of the lid while surrounding the first exhaust channel so as to seal a space between the intake hole and the first exhaust channel.

* * * * *